United States Patent Office 3,476,588
Patented Nov. 4, 1969

3,476,588
PROCESS FOR COATING TABLETS
Guy Pitel, Courbevoie, France, assignor to Societe d'Etudes Scientifiques et Industrielles de l'Ile-de-France, Longjumeau, Essonne, France, a corporation of France
No Drawing. Filed Aug. 23, 1965, Ser. No. 481,946
Claims priority, application France, Oct. 20, 1964, 992,079
Int. Cl. C09d 3/12; A61j 3/06
U.S. Cl. 117—100        3 Claims

ABSTRACT OF THE DISCLOSURE

A film coats tablets to form a membrane which is semi-permeable to water thereby permitting the tablet to disintegrate in two or three minutes after administration. Yet, the coating on the tablet gives excellent protection against external media. The dual characteristics are achieved by the combination in a coating composition of a film-forming water insoluble solid, a water soluble polyglycol of high molecular weight and a plurality of solvents which solubilize both the solid and the polyglycol.

---

The technique normally used for coating tablets, designed to mask an odor, a color or a taste or to protect an active constituent from external agents, consists in the repeated application of coats of lacquer and syrups comprising gelatine gum and pigments.

The method has the disadvantage that it is tedious, that it considerably increases the weight of the tablets and that it subjects the active constituent to the action of solvents, humidity or heat, which are sometimes harmful to it.

The present invention comprises forming a tablet by continuously applying a film-forming solution around the core of the tablet at low temperature, thus avoiding deterioration of the active ingredients, and with virtually instantaneous drying. If desired, pigments or other coloring agents may be added to the film-forming solution. As the film forms a membrane which is semipermeable to water, it allows the tablet to disintegrate after not more than two or three minutes, the exact time depending on the precise constituents of the film. The weight of the tablet is not greatly affected by the film, and the film nevertheless gives good protection against external media. The term "tablet" in the description and claims of this invention embraces within its scope granules or other discrete particles, which require a coating for masking odor, color or taste, for protection from external agents or other purposes.

The composition employed for coating tablets in accordance with this invention comprises a mixture, in suitable organic solvents, of:

(a) A substance that is insoluble in water but has the property of forming plastic films by evaporating a solution in an organic solvent; e.g., ethylcellulose; and (b) A solid that is soluble both in water and in the selected organic solvent or solvents, e.g., a polyglycol having a molecular weight of at least 6000. Polyglycol has the property of converting the water-insoluble film formed by the ethylcellulose into a film semipermeable to water and enables the tablet to disintegrate.

The solvents in which the coating composition is dissolved comprises a mixture of two solvents which solubilize both polyglycol and ethylcellulose and which are volatile under specific conditions, so that they enable the coating solution to be continuously applied without the tablets sticking together and, on the other hand, without there being any sliding in the centrifuge where the coating is carried out. The most favorable solvent is a mixture of equal quantities of an alcohol, e.g., methyl alcohol, ethyl alcohol, or isopropyl alcohol, and a chlorinated organic solvent, e.g., chloroform, methylene chloride, or 1,1,1-trichloroethane. Instead of one alcohol and one chlorinated organic solvent, a plurality of alcohols and chlorinated solvents may be used.

Being non-inflammable and non-explosive, chlorinated solvents enable the coating operations to be carried out in complete safety. The use of 1,1,1-trichloroethane is of particular advantage because of its low price and the fact that it is less toxic than methylene chloride or chloroform.

Fillers may be added to the coating solution either to obtain an opaque or colored covering. For example, talc or titanium oxide, colors approved as complying with the requirements of the U.S. Food, Drug and Cosmetic Act, water insoluble pigments, such as aluminum lacquers or non-toxic metallic oxides, such as iron oxide may be used for this purpose.

The physical properties of the film obtained on the tablets may be modified by varying the proportions of ethylcellulose and polyglycol or by modifying the viscosity of the ethylcellulose used. Thus, increasing the percentage of ethylcellulose reduces the perviousness of the film formed to water, and conversely increasing the percentage of polyglycol makes the film more pervious. Moreover, ethylcellulose of low viscosity (10 cps.) forms films which are more flexible and more pervious to water, and conversely ethylcellulose of higher viscosity (100 cps.) produces coverings which are harder and less pervious.

Alternatively, substances designed to produce special effects may be added to the coating solvents. Resistance to water, for example, is increased by adding paraffin or a hard fat. Addition of wax gives a brighter coating. The addition of a fatty acid such as stearic, palmitic or lauric acid leads to a film which has a certain resistance to dissolution in the stomach.

The apparatus conveniently used for applying the coating solution comprises a coating centrifuge equipped with a hot air blowing and vapor suction system, and equipment, including a spray gun, for atomizing the coating solution.

The process comprises placing the tablets in a centrifuge, rotating them, blowing in hot air in a quantity sufficient to bring the tablets to a temperature of 35 to 40° C., then atomizing the coating while regulating the discharge so as to obtain instantaneous drying.

Application of the coating solution is continued until a film of the desired thickness is obtained on the tablets. In the majority of cases, it has been found satisfactory to apply 750 ml. of solution per kilogram of tablets.

The application time is not generally longer than four hours for 35 kilograms of tablets.

A more comprehensive understanding of this invention is obtained by reference to the following examples in which a mixture of the ingredients indicated in each example, forms a solution with or without solid filler, e.g., titanium oxide substantially uniformly dispensed therein, and such solution is applied to the tablets as above described.

Example 1

| | | |
|---|---|---|
| Ethylcellulose (50 cps.) | g | 3.50 |
| Polyglycol 6000 | g | 7 |
| Ethyl alcohol | ml | 50 |
| Chloroform | ml | 50 |

Example 2

| | | |
|---|---|---|
| Ethylcellulose (50 cps.) | g | 3.50 |
| Polyglycol 20,000 | g | 7 |
| Titanium oxide | g | 3 |
| Talc | g | 1 |
| Ethyl alcohol | ml | 50 |
| 1,1,1-trichloroethane | ml | 50 |

Example 3

| | | |
|---|---|---|
| Ethylcellulose (50 cps.) | g | 3.50 |
| Polyglycol 10,000 | g | 7 |
| Titanium oxide | g | 3 |
| Talc | g | 1 |
| Tartrazine aluminum lacquer | g | 0.30 |
| Ethyl alcohol | ml | 50 |
| 1,1,1-trichloroethane | ml | 50 |

What is claimed is:

1. The continuous process of coating tablets which comprises coating said tablets with a solution of a composition comprising ethylcellulose, a polygonal having a molecular weight of at least 6000, a mixture of an alcohol in which said polyglycol is soluble and said ethylcellulose is insoluble and a chlorinated organic solvent in which said ethylcellulose and alcohol are soluble and removing the solvents from the coating composition to leave a film coating on said tablets, said polyglycol being in an amount sufficient to render said film coating semi-permeable to water.

2. The process of coating tablets in accordance with claim 1, in which the alcohol is ethanol.

3. The process of coating tablets in accordance with claim 1, in which the chlorinated organic solvent is 1,1,1-trichloroethane.

References Cited

UNITED STATES PATENTS

| | | | |
|---|---|---|---|
| 2,881,085 | 4/1959 | Endicott et al. | 167—82.8 X |
| 2,917,387 | 12/1959 | Specht | 117—100 X |
| 3,097,144 | 7/1963 | Banker | 167—82.8 X |
| 3,115,441 | 12/1963 | Hermelin | 167—82.8 X |
| 2,106,296 | 1/1938 | Dreyfus et al. | 106—189 X |
| 2,169,537 | 8/1939 | Ossenbrunner et al. | 106—190 X |
| 2,986,475 | 5/1961 | Mesnard et al. | 117—100 |
| 2,207,702 | 7/1940 | Straughn | 106—189 |
| 3,096,248 | 7/1963 | Rudzki | 117—100 X |
| 3,112,220 | 11/1963 | Heizer et al. | 117—100 |
| 3,141,792 | 7/1964 | Lachman et al. | 117—100 X |

WILLIAM D. MARTIN, Primary Examiner

M. R. P. PERRONE, JR., Assistant Examiner

U.S. Cl. X.R.

106—189, 190; 117—166; 424—35